United States Patent [19]

Hamada et al.

[11] 4,149,264

[45] Apr. 10, 1979

[54] CRT DISPLAY APPARATUS OF RASTER SCANNING TYPE

[75] Inventors: Nagaharu Hamada; Masahiro Iwamura, both of Hitachi, Japan

[73] Assignee: Hitachi, Ltd., Japan

[21] Appl. No.: 802,463

[22] Filed: Jun. 1, 1977

[30] Foreign Application Priority Data

Jun. 2, 1976 [JP] Japan ................................ 51-63500

[51] Int. Cl.[2] ................................................ G06F 3/14

[52] U.S. Cl. .................................... 364/900; 364/200

[58] Field of Search ... 364/200 MS File, 900 MS File

[56] References Cited

U.S. PATENT DOCUMENTS

| | | | |
|---|---|---|---|
| 3,886,526 | 5/1975 | Smith | 340/172.5 |
| 3,916,370 | 10/1975 | Neeley | 340/172.5 |

*Primary Examiner*—Gareth D. Shaw
*Assistant Examiner*—C. T. Bartz
*Attorney, Agent, or Firm*—Craig & Antonelli

[57] ABSTRACT

Disclosed is a CRT display apparatus of a raster scanning type which includes a microprocessor as a unit for data handling or processing in an input/output control part for controlling data transfer with a computer and/or keyboard, the operations of the microprocessor being controlled by a microprogram stored in a microprogram memory. A timing control unit or part for producing various timing signals for controlling displays is connected to the microprocessor through a data bus and an address bus so that control parameter for the various timing operations can be set through the microprogram. The timing control part comprises programmable control registers, counters for generating timing signals and coincidence detectors or comparators for detecting coincidence between the outputs from the control registers and the timing signals from the associated counters.

2 Claims, 4 Drawing Figures

(a)

(b)

ADDRESSES OF CONTROL REGISTERS

| | |
|---|---|
| α | HORIZONTAL SYNCHRONOUS POSITION COMMAND |
| α+1 | CHARACTER COUNTER CONTROL |
| α+2 | HORIZONTAL CHARACTER POSITION COMMAND |
| α+3 | RASTER COUNTER CONTROL |
| α+4 | VERTICAL SYNCHRONOUS POSITION COMMAND |
| α+5 | LINE COUNTER CONTROL |
| α+6 | VERTICAL LINE COMMAND |

(c)

TABLE OF INITIAL VALUES

| | |
|---|---|
| β | 96 |
| β+1 | 112 |
| β+2 | 80 |
| β+3 | 12 |
| β+4 | 25 |
| β+5 | 26 |
| β+6 | 24 |

(EXEMPLARY CASE OF 80 CHARACTERS X 24 LINES DISPLAY)

CRT DISPLAY APPARATUS OF RASTER SCANNING TYPE

BACKGROUND OF THE INVENTION

1. Field of the Invention

The present invention relates to a CRT (cathode ray tube) display apparatus of a raster scanning type which includes a microprocessor as a center processor for data handling or processing in an input/output control part for controlling data transfer with a computer and/or keyboard or the like, wherein the operations of the microprocessor is controlled by a microprogram stored in a microprogram memory.

DESCRIPTION OF THE PRIOR ART

Typically, a CRT display apparatus comprises an input/output control part for controlling data transfer or data inputs and outputs to and from external information sources such as a computer and keyboard, a refresh memory for storing display data for one frame of image, a video controller for generating video signal in accordance with the display data, a viewer or display device for converting the video signals into a visible image and a timing control part for controlling timings in operations of the various parts described above.

The performance of such display apparatus largely depends on the control functions of the input/output control part and the video controller. As higher performance and more sophisticated operations are demanded for the display apparatus, the quantity of hardware required for the control parts is considerably increased, involving high manufacturing cost.

As an attempt to dispose of the above problem, it has already been proposed to adopt a microprogram control system, thereby to impart high flexibility to the control parts and at the same time reduce the quantity of hardware as well as the manufacturing costs. For example, reference is to be made to "HEWLETT-PACKARD JOURNAL" published July, 1975. In the case of the display apparatus in which such microprogram control is employed, a microprocessor is provided as the heart of the input/output control part for the data processing or handling and adapted to be controlled by a microprogram stored in a microprogram memory. The microprocessor is connected to an interface controller and an input/output connecting interface through the address bus and the data bus. The interface controller is adapted to perform data transfer to and from a computer through a communication line or leased channel. On the other hand, the input/output connecting interface is adapted to perform the data transfer with input/output devices of a keyboard, printer, light pen or the like through the respective input/output adaptors.

At present, LSI's (large scale integrated circuits) for general purpose are available for the microprocessor, the microprogram memory, the interface controller, the input/output connecting interface and the refresh memory, whereby reduction in the quantity of hardware for the display apparatus, enhanced reliability thereof as well as reduction in the manufacturing costs have been attained to a significant degree.

In contrast, the video controller and the timing control part are yet constituted by discrete IC circuits for the reason that the implementation of these parts with high operating speeds and flexibility in use is difficult to be realized. Accordingly, the ratio of the quantities of hardware required for these control parts relative to those required for the whole display apparatus is relatively high. In particular, the timing control part must be discretely designed and manufactured in dependence on the practical applications where it is employed by taking into consideration a deflection frequency of the viewer (display device), the number of characters to be displayed per line, the number of lines per frame of image to be displayed and the number of dots in horizontal and vertical directions required for constituting one character. Since these parameters are often varied in dependence of intended applications, the timing control unit gives rise to a serious problem in the manufacturing management of CRT display apparatus.

SUMMARY OF THE INVENTION

An object of the invention is to provide a CRT display apparatus having a timing control unit of which variable control parameters for the various timing operations are made to be programmable.

According to one aspect of the invention, the timing control part is connected to a microprocessor through a data bus and an address bus so that various timing control parameters can be set with the aid of microprograms.

According to another aspect of the invention, the timing control part comprises a group of programmable control registers for determining control parameters, various counters for generating timing signals and comparators or coincidence detectors for detecting coincidences between the outputs from the control registers and the timing signals output from the associated counters so that desired values of variables or parameters can be set in the control registers during the initial loading or starting (initiation) routine.

DETAILED DESCRIPTION OF THE PREFERRED EMBODIMENTS

Figure 1:
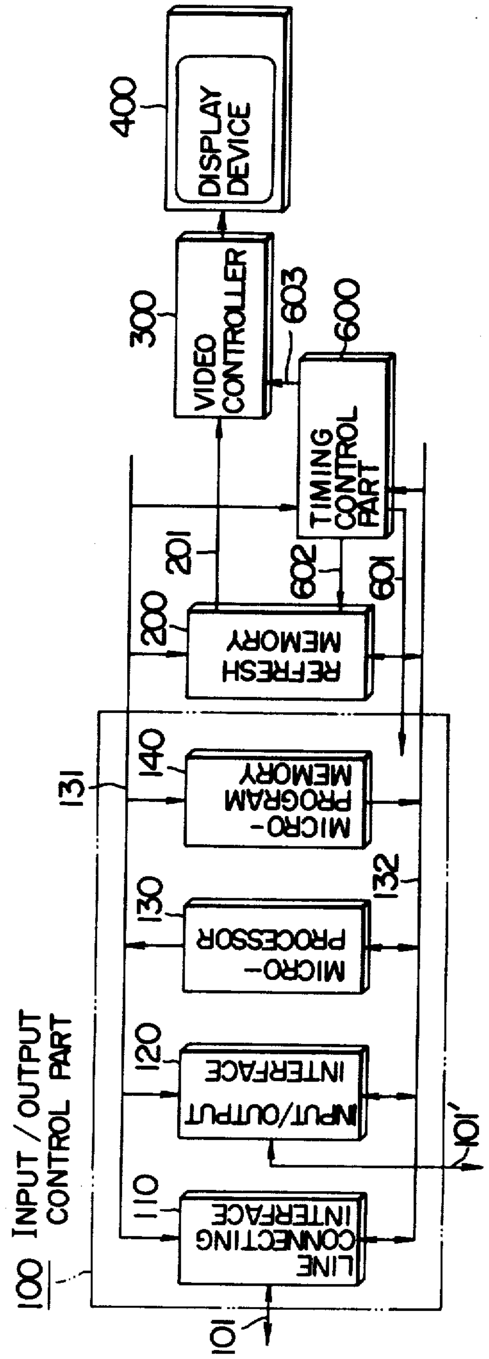
FIG. 1 shows schematically a general arrangement of a CRT display apparatus in which a microprogram control system is adopted for a timing control part according to the teachings of the invention.

FIG. 1 shows schematically a general arrangement of a display apparatus to which a microprogram control system according to the invention is applied. In the figure, a broken line block 100 represents an input/output control part for controlling data input/output to and from an external information source such as a computer or key-board or the like (not shown). The input/output control part 100 is adapted to be controlled by a microprogram as hereinafter described. Reference numeral 200 denotes a refresh memory for storing data corresponding to a single frame of image to be displayed, numeral 300 denotes a video signal generator (or video controller) for producing video signals corresponding to the data to be displayed, numeral 400 denotes a display unit for displaying the video signals as a visible image, and reference numeral 600 designates a timing control part or unit for controlling timings in the operations of the above described parts.

The input/output control part 100 includes a microprocessor 130 which functions as a unit for data processing or handling and is adapted to be controlled by a microprogram stored in a microprogram memory 140. The microprocessor 130 is connected to a line connecting interface 110 and an input/output interface 120 through an address bus 131 and a data bus 132. The line connecting interface 110 is adapted to perform data transfer with a computer by way of an input/output line 101 through a communication line or exclusive channel (not shown), while the input/output interface 120 controls the data transfer operations between the input/output control part 100 and input/output devices of a key board, printer, light pen or the like apparatus (not shown) through respective adapters and a line 101'.

An important feature of the present invention resides in the timing control unit 600 which is connected to the microprocessor 130 through the address bus 131 and the data bus 132 and can be loaded with control parameters or variables for various timing operations through corresponding microprograms, as will be hereinafter described.

Figure 2:
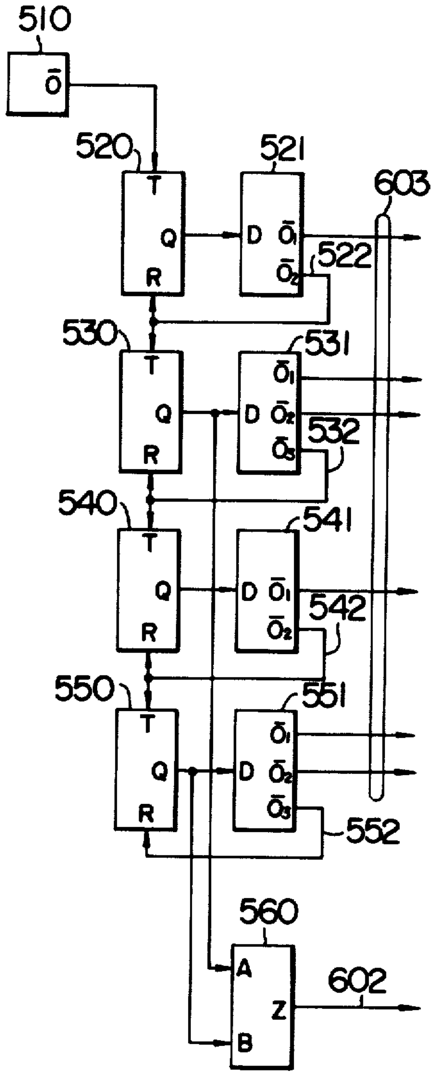
FIG. 2 PRIOR ART
FIG. 2 is a circuit diagram showing a hitherto known timing control part of a CRT display apparatus.

In order to have a better understanding of the timing control unit 600 according to the invention, description will be first made to a hitherto known timing controller shown in FIG. 2. As can be seen from the figure, the timing control unit of the prior art is composed of a basic clock pulse generator circuit 510 for producing the basic clock pulses to determine the timing of dots each of which constitutes a minimum element of an image to be displayed, a dot counter 520 for determining dot timing for individual characters and spaces therebetween, an associated dot decoder 521, a character counter 530 for determining horizontal positions of characters on a raster, an associated character decoder 531, a raster counter 540 for determining the number of rasters constituting one line, an associated raster decoder 541, a line counter 550 for determining vertical positions of the lines constituting one frame of the image, an associated line decoder 551, and an address converter circuit 560 for supplying address signals for display to the refresh memory 200. Additionally, it is required that timing control signals proper to the microprocessor 130, line connecting interface controller 110, input/output connecting interface 120 or the like have to be produced and supplied to these units. These timing signals can however be easily produced by a suitable timing generator schematically denoted by symbol 603. Accordingly, any further description in this respect will be unnecessary.

The basic clock generator circuit 510 serves to determine or define the minimum unit time for a dot and generates the basic clock pulses having duration on the order of 120 ns/dot for the display of forty (40) characters per line and on the order of 60 ns/dot for the display of eighty (80) characters per line when a standard television type viewer or display is employed.

The dot counter 520 receives at a trigger terminal T the basic clock pulses each corresponding to a dot as produced by the basic clock generator circuit 510 and divides or counts down the basic clock pulses at a rate of k for generating a unit time for displaying one character in dependence on the number of dots constituting the one character (i.e. 1/k counter). When one character is composed of $5\times7$ dots, k is selected equal to 7 in most cases, while k is equal to 12 or 13 when one character is composed of $7\times9$ dots. The output Q from the dot counter 520 is connected to a data input terminal D of the dot decoder 521 and decoded by the latter. The decoder 521 produces a required dot timing signal $\overline{O}_1$ and at the same time produces a signal 522 when the dot counter 520 has counted k dot pulses. The signal 522 is applied to the reset terminal R of the dot counter 520 so that the latter may perform the counting operation at the rate of 1/k.

The character counter 530 is also adapted to receive at a trigger terminal T thereof the same signal 522 as the one applied to the reset terminal R of the dot counter 530 and count l character positions in response to the timing signals for every character (i.e. 1/l counter). Usually, l is selected about 60 for the display of fourty (40) characters and about 110 for the display of eighty (80) characters. The output Q from the character counter 530 is applied to the character decoder 531 at the decoding input terminal D thereof to be decoded for generating a horizontal synchronizing signal output $\overline{O}_1$, a horizontal character position signal $\overline{O}_2$ and a signal $\overline{O}_3$ (or 532). The signal $\overline{O}_3$ or 532 is applied to the reset terminal R of the character counter 530 for controlling the 1/l counting operation thereof.

The same signal 532 is also applied to the raster counter 540 at a trigger terminal T thereof which is adapted to count m rasters constituting one line (i.e. 1/m counter). In this connection, m is selected to be equal to about 12 for the dot array in number of $5\times7$ and about 16 in the case of $7\times9$ dot array. The output Q from the raster counter 540 is applied to the data input terminal D of the raster decoder 541 to be decoded for generating a raster address signal $\overline{O}_1$ for allowing access to a character or pattern generator (not shown) of the video control part 300 as well as a signal $\overline{O}_2$ (or 542) for controlling the 1/m counting operation of the raster counter 540. To this end, the signal 542 is applied to the reset terminal R of the raster counter 540.

The line counter 550 receives at a trigger terminal T thereof the same signal 542 as the one applied to the reset terminal R of the raster counter 540 and is adapted to count n lines constituting one frame of image (i.e. 1/n counter). In this conjunction, n is selected to be about 20 for the display of 16 lines and about 26 for the display of 24 lines. The output Q from the line counter 550 is fed to the line decoder 551 at a data input terminal thereof and decoded to generate the vertical synchronizing signal output $\overline{O}_1$, a vertical line position signal $\overline{O}_2$ and a signal $\overline{O}_3$ (or 550) for controlling the operation of the line counter 550. To this end, the signal 552 is applied to the reset terminal R of the line counter 550.

The address conversion circuit 560 has an input terminal A connected to the output terminal Q of the character counter 530 and another input terminal B connected to the output terminal Q of the line counter 550 and is adapted to excute the address conversion so that the addressing to the refresh memory 200 can be successively made in dependence on the output signals from both counters 530 and 550. For example, when forty (40) characters per line and eighty (80) characters per line are to be displayed, the address conversions are made such that $Z=A+40\times B$ and $Z=A+80\times B$, respectively.

As will be appreciated from the foregoing description, values of parameters or variables k, l, m and n as well as contents to be decoded for the various counters and decoders constituting the timing control unit as described above will vary in dependence on the deflection frequency of the display CTR or viewer, the number of characters per line to be displayed, the number of lines per frame of image to be displayed, the dot array for one character or the like, as necessarily accompanied with various conversion logics imposed on the address conversion circuit 560. Such being the circumstances, the timing control unit or part is not only restricted in respect of the flexibility in use but also complicated in design, involving increased number and cost of the manufacturing processes.

It is contemplated with the present invention to eliminate such drawbacks of the prior art timing control unit as above described. According to the teaching of the invention, there is provided the programmable timing control unit or part 600 which is connected to the microprocessor 130 through the address bus 131 and the data bus 132 so as to be operated under the control command from the microprocessor 130. With such arrangement, when a power source (not shown) for the display apparatus is turned on, an initial loading (initiation) routine of the microprocessor 130 may become operative and the programmable timing control part 600 is thereby applied with a trigger signal during the execution of the initial loading routine.

Figure 3:
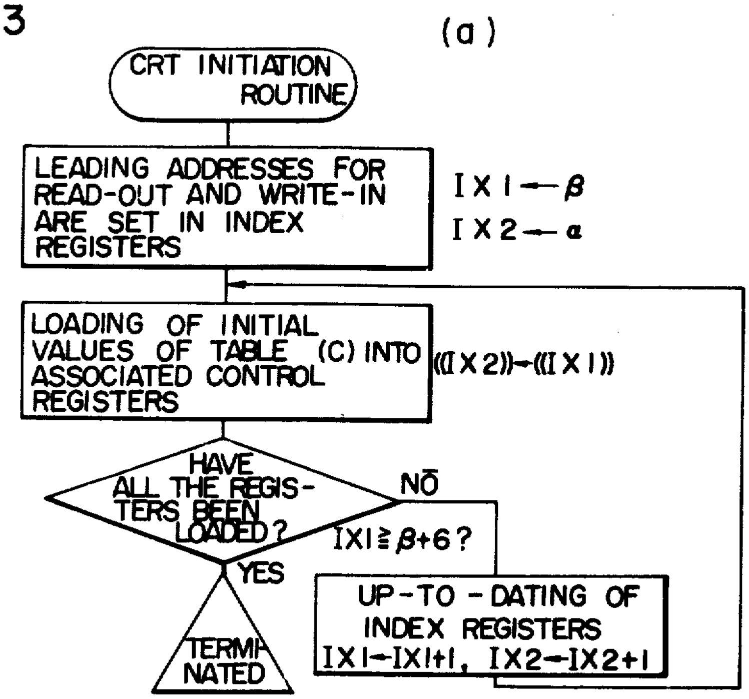
FIG. 3 is a flow chart illustrating an exemplary initiation routine executed for a timing control part according to the invention.

An example of the initial loading routine for various control registers or counters is illustrated in a flow chart (a) shown in FIG. 3. It is assumed that the addresses of the control registers (counters) are assigned with addresses $\alpha$ to $\alpha+6$ as listed in the table (b) shown in FIG. 3 and that the initial values to be set in these registers are stored in the program memory at the addresses $\beta$ to $\beta+6$ as illustrated in the table (c) shown in FIG. 3. In the execution of the initial loading routine, index registers 1 ($I\times1$) and 2 ($I\times2$) both of which are provided in the microprocessor 130 are first loaded, respectively, with the leading address $\beta$ listed in the initial value table (c) shown in FIG. 3 and the leading address $\alpha$ of the control registers to be initiated. Subsequently, contents at the address as designated by the index register 1 are transferred to an address designated or commanded by the index register 2. In other words, data (96) at the address $\beta$ are set in the horizontal synchronizing position register at the address $\alpha$. Thereafter, it is determined whether the initial values have been loaded or written in all the registers, a discrimination criterion for which may be realized by seeing whether the contents ($I\times1$) in the index register 1 exceeds ($\beta+6$). When the contents ($I\times1$) in the index register 1 becomes greater than ($\beta+6$), it is determined that the required initiations have been completed and the initial loading routine is terminated. In case the contents in the index register ($I\times1$) has not attained the value ($\beta+6$), the index registers 1 and 2 ($I\times1$, $I\times2$) are each loaded with (+1) and the routine is returned back to the step preceding the transferring of the initial values to the control registers. Subsequently, data transfer is executed between the succeeding addresses. In this manner, the above subroutine is repeated until the initiations have been completed.

Figure 4:
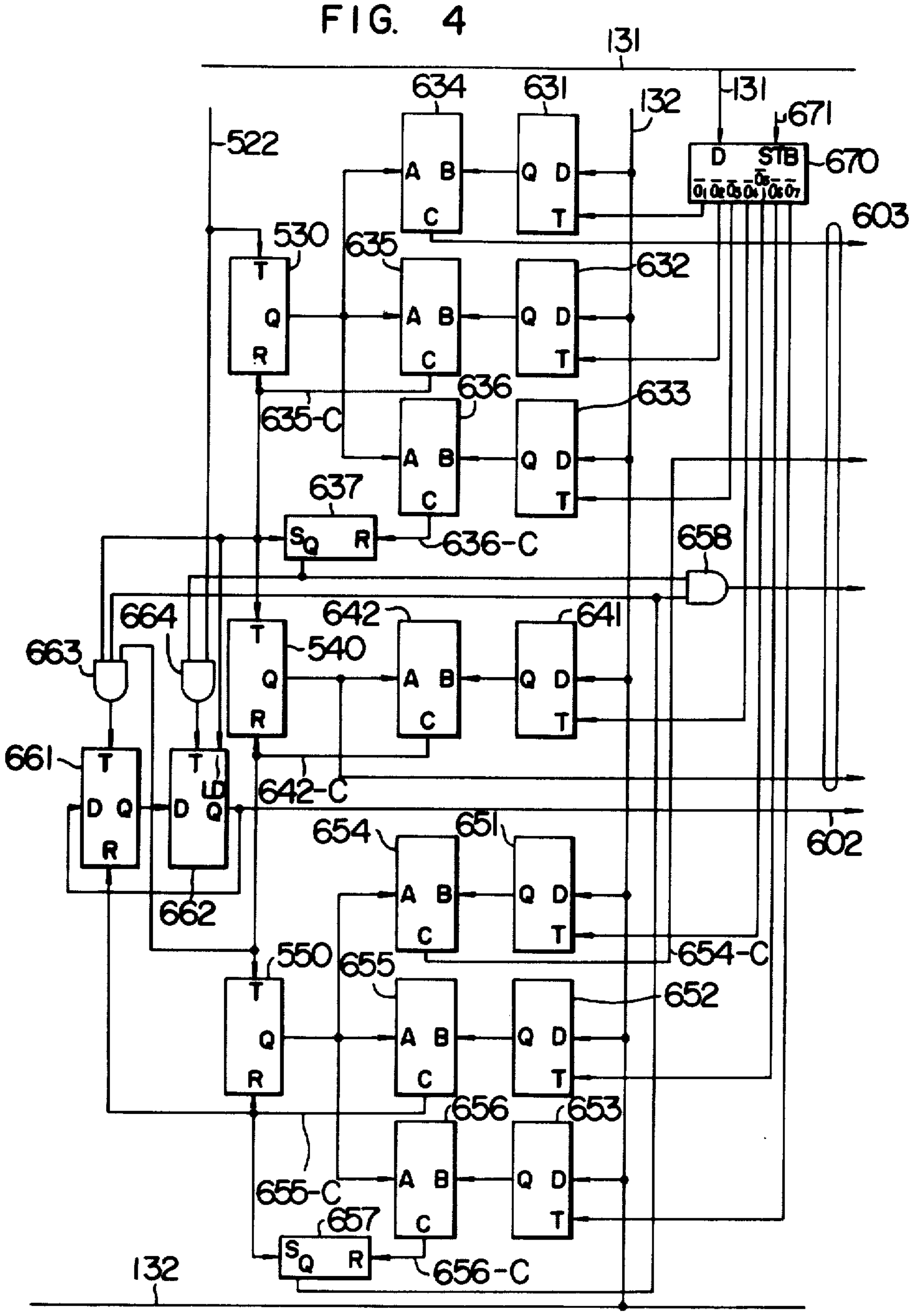
FIG. 4 is a schematic circuit diagram showing an exemplary embodiment of the timing control part according to the invention.

FIG. 4 shows schematically an exemplary embodiment of a programmable portion constituting the programmable timing control unit 600 according to the invention. In the case of the illustrated embodiment, arrangement is made such that additional variables such as those for defining or controlling the timing at which the horizontal synchronizing signal is generated, for defining horizontal display position, for controlling the timing at which the vertical synchronizing signal is generated and for defining the vertical display position may be set as the programmable variables in addition to those character counter number l for determining the horizontal repetition frequency, the raster number m per line and the line count number n which determines the vertical repetition frequency, as described hereinbefore in conjunction with FIG. 2. Althrough the dot count number k can be taken into program, this variable is excluded from the group of the programmable variables in consideration of operation speed of MOS devices when the timing control unit is implemented as LSI.

Referring to FIG. 4, the programmable timing control unit or part 600 comprises a character counter 530 for counting signals 522 representing one character thereby to determine or define the 1/k signal input to the reset terminal R of the dot counter (not shown in FIG. 4), a raster counter 540 for counting signals 635-C corresponding to one horizontal period thereby to determine the 1/l signal applied to the reset terminal R of the character counter 530 and a line counter 550 for counting signals 642-C corresponding to one line thereby to determine the 1/m signal applied to the reset terminal R of the raster counter 540. Additionally, the timing control unit 600 comprises a group of seven programmable registers including a horizontal synchronizing position command register 631, a character counter control register 632, a horizontal display character command register 633, a raster counter control register 641, a vertical synchronizing position command register 651, a line counter control register 652 and a vertical display line command register 653. Besides, in correspondence to these programmable registers, there are provided a group of seven coincidence detecting circuits including a horizontal synchronization detector circuitry 634, a character reset detector 635, a horizontal display position detector 636, a raster reset detector 642, a vertical synchronization detector 654, a line reset detector 655 and a vertical display position detector 656. Further, there are provided a horizontal display control flip-flop 637 for determining the horizontal display position, a vertical display control flip-flop 657 for determining the vertical display position control gate 658, a display address correcting register 661 for address conversion to command the addresses for display and a display address counter 662 together with control gates including a display address correction control gate 663 and a display address count control gate 664. Finally, there is also provided a control register address decoder 670 for selecting one register from the group of the above described control registers.

The individual control registers 631 to 633, 641, 651 to 653 constituting the control register group have respective data input terminals D connected to the data bus 132 and trigger terminals T which are selectively applied with register command signals $\overline{O}_1$ to $\overline{O}_7$ as decoded by the control register address decoder 670 which in turn has a data input terminal connected to the address bus 131 and produces a command to select one from the control register group. Further, with a view to giving significance to a decoded output from the control register address decoder 670, a strobe signal 671 is applied to a strobe terminal STB of the decoder 670 in compliance with the operation timing of the microprocessor.

The individual coincidence detector circuitries 634 to 636, 642 and 654 to 656 belonging to the coincidence detection circuit group have respective input terminals A applied with the output Q from the associated counters and other input terminals B adapted to be applied with the output signals Q from the associated control registers, whereby the detector circuitries produce respective coincidence output signals when both input signals at A and B coincide with each other, i.e. A=B. In more detail, the horizontal synchronization detector 634 detects coincidence between the output of the character counter 530 and the character display timing as determined by the horizontal synchronous position command register 631 thereby to produce the horizontal synchronizing signal at the output terminal C, while the character reset detector 635 detects the coincidence between the output from character counter 530 and the character display timing as determined by the character control register 632 thereby to produce a character counter reset signal 635-C at the output terminal thereof. The horizontal display position detector 636 produces a horizontal display position reset signal 636-C at the output terminal C thereof when coincidence is found between the output from the character counter 530 and the character display timing determined by the horizontal character display command register 633. The raster reset detector 642 produces a raster counter reset signal 642-C at the output terminal C thereof upon coincidence being detected between the output from the raster counter 540 and the raster timing as determined by the raster counter control register 641. On the other hand, when coincidence is detected between the output of the line counter 550 and the line display timing determined by the vertical synchronous position command register 651, the vertical synchronization detector 654 produces a vertical synchronizing signal 654-C at the output terminal C thereof. Further, the line reset detector 655 produces a line counter reset signal 655-C at the output terminal C thereof upon occurring of coincidence between the output from the line counter 550 and the line display timing generated by the line counter control register 652, while the vertical display position detector 656 detects coincidence between the output from the line counter 550 and the line display timing as commanded by the vertical line display command register 653 thereby to produce a vertical display position reset signal 656-C at the output terminal C.

The horizontal display control flip-flop 637 is adapted to be set by the reset timing signal 635-C from the character counter 530 and reset by the horizontal display position reset signal 636-C output from the horizontal display position detector 636. In this manner, an effective horizontal address range for one line display extending from "zero character position" to "character position corresponding to the number of characters per line to be displayed minus one character" can be determined for the character counter 530.

The vertical display control flip-flop 657 is adapted to be set by the reset timing signal 655-C from the line counter 550 and reset by the vertical display position reset signal 656-C output from the terminal C of the vertical display position detector 656, whereby an effective address range for a single frame display extending from "zero line display position" to "line position corresponding to the number of lines per frame minus one line" can be determined for the line counter 550.

The display position control gate 658 is composed of an AND gate having two inputs connected, respectively, to the affirmative output terminals Q of the horizontal display control flip-flop 637 and of the vertical display control flip-flop 657. In this manner, the output signals from the display position control gate 658 will define an effective display area for one image frame in the vertical and horizontal directions.

The horizontal synchronizing signal, the vertical synchronizing signal, the effective area signals and the raster count signal output from the raster counter 540 are fed to the display control circuit 300 through a signal line 603 and serve for similar functions as in the case of the conventional system described hereinbefore in conjunction with FIG. 2.

The display address correcting register 661 has a data input terminal D applied with the output signal Q (602) from the display address counter 662, a reset terminal R applied with a reset signal 665-C from the line counter 550 and a trigger terminal T applied with the output signal from the display address correction control gate 663 which is constituted by an AND gate having three inputs. One of the input terminals of the display address correction control gate 663 is applied with the reset signal 635-C from the character counter 530, while another input terminal of the same gate 663 is supplied with signal from the affirmative output terminal Q of the vertical display control flip-flop 657, and the remaining input terminal is supplied with the reset signal 542-C from the rester counter 540. Accordingly, the display address correcting register 661 is reset immediately before the line counter 550 is reset or before the display of the zero-th line begins and thereafter holds the outputs Q from the display address counter 662 for every completed display of one line so far as the lines belong to the effective display area in the vertical direction.

The display address counter 662 has a data input terminal D connected to the output terminal Q of the display address correcting register 661 and a count trigger terminal T connected to the output terminal of the display address count control gate 664. The counter 662 further has a parallel input terminal LD applied with the reset signal 635-C from the character counter 530. The display address count control gate 664 is constituted by an AND gate having two inputs one of which is applied with the affirmative output Q of the horizontal display control flip-flop 637, while the other input is applied with the character timing signals 522 each for display of one character. Thus, the display address counter 662 is loaded with the contents of the display address correcting register 661 before one raster for one line begins to be displayed, thereby to count the number of characters to be displayed remaining in the horizontal effective display area as starting from the loaded contents or counts.

Since the initial value set in the display address counter 662 is corrected by the display address correcting register 661 on the line-by-line basis, it is possible to obtain successively the parely binary display address signals 602 from the output terminal Q of the display address counter 662.

As will be appreciated from the foregoing description, many variables of the timing control unit 600 as described hereinbefore can be set in an arbitrary manner through corresponding programmings. Thus, the programmable portion of the timing control unit has a great flexibility in use and can be employed for general purpose applications.

Further, the construction of the programmable portion of the timing control unit 600 is relatively simple, only requiring counters, registers and coincidence detector circuitries together with a few logic gates as well as a relatively small number of signal lines for the data transfer. Thus, the programmable portion of the timing control unit 600 is suited to be implemented in LSI.

We claim:

1. A raster scan type display apparatus for displaying information from a central processing unit and a key board comprising:

an input/output control part which comprises:

a common address bus, a common data bus, a line connecting interface connected between the common address bus and the common data bus and connected to the central processing unit, an input/output connecting interface connected between the common address bus and the common data bus and connected to the key board, a program memory connected between the common address bus and the common data bus, a microprocessor connected between the common address bus and the common data bus, a refresh memory connected between the common address bus and the common data bus of said input/output control part for storing data for an image to be displayed, whereby the input/output operation between the refresh memory and the central processing unit, and the input/output operation between the refresh memory and the key board are controlled by said input/output control part;

a video controller connected to the refresh memory for generating video signals in accordance with the data from said refresh memory;

a raster scan type display device connected to the video controller for converting said video signals into an image; and a timing controller connected between the common address bus and the common data bus of said input/output control part, and connected to the refresh memory and the video controller for generating a read out timing signal to said refresh memory and a display timing signal including character display timing, raster display timing and line display timing to said video controller; whereby the generated timings of the read out and display timing signals are determined by the microprocessor of said input/output control part.

2. A raster scan type display apparatus as set forth in claim 1, wherein said timing controller includes:

a control register address decoder connected to the common address bus of said input/output control part for decoding the control register address signals from the microprocessor of said input/output control part;

a character counter;

a character counter control register having a data input terminal connected to the common data bus of said input/output control part and having a trigger terminal connected to one of the output terminals of the control register address decoder for determining the character display timing;

a character reset detector connected between the character counter and the character counter control register for resetting the character counter when coincidence is detected between the output from the character counter and the character display timing determined by the character control register;

a raster counter;

a raster counter control register having a data input terminal connected to the common data bus of said input/output control part and having a trigger terminal connected to one of the output terminals of the control register address decoder for determining the raster display timing;

a raster reset detector connected between the raster counter and the raster counter control register for resetting the raster counter when coincidence is detected between the output from the raster counter and the raster display timing determined by the raster control register;

a line counter;

a line counter control register having a data input terminal connected to the common data bus of said input/output control part and having a trigger terminal connected to one of the output terminals of the control register address decoder for determining the line display timing; and a line reset detector connected between the line counter and the line counter control register for resetting the line counter when coincidence is detected between the output from the line counter and the line display timing determined by the line control register.

* * * * *